(12) United States Patent
Tseng

(10) Patent No.: US 12,096,879 B2
(45) Date of Patent: Sep. 24, 2024

(54) CAPSULE COFFEE MACHINE

(71) Applicant: Cheng Uei Precision Industry Co., LTD., New Taipei (TW)

(72) Inventor: Chi-Ming Tseng, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 749 days.

(21) Appl. No.: 17/357,976

(22) Filed: Jun. 24, 2021

(65) Prior Publication Data

US 2022/0071434 A1 Mar. 10, 2022

(30) Foreign Application Priority Data

Sep. 9, 2020 (CN) .......................... 202021961523.X

(51) Int. Cl.
| | |
|---|---|
| *A47J 31/36* | (2006.01) |
| *A47J 31/44* | (2006.01) |
| *A47J 31/52* | (2006.01) |
| *B65D 85/804* | (2006.01) |
| *F16H 37/12* | (2006.01) |

(52) U.S. Cl.
CPC ....... *A47J 31/3633* (2013.01); *A47J 31/3628* (2013.01); *A47J 31/3638* (2013.01); *A47J 31/4492* (2013.01); *A47J 31/525* (2018.08); *B65D 85/8061* (2020.05); *F16H 37/126* (2013.01)

(58) Field of Classification Search
CPC ................. A47J 31/3633; A47J 31/3638; A47J 31/4492; A47J 31/3628; A47J 31/3642; A47J 31/0673; A47J 31/0678; A47J 31/3695; A47J 31/407; A47J 31/4407; A47J 31/46; A47J 31/525; A47J 31/5255; B26F 1/18; B65D 85/8061; F16H 37/126
USPC ............ 99/295, 279, 302 R, 443 R; 426/433
See application file for complete search history.

(56) References Cited

U.S. PATENT DOCUMENTS

| | | | |
|---|---|---|---|
| 2010/0239734 A1* | 9/2010 | Yoakim ................... | A47J 31/22 99/302 C |
| 2018/0303273 A1* | 10/2018 | Perentes ............... | A47J 31/525 |

OTHER PUBLICATIONS

Gunstone, EP 2915465 A1 (Year: 2015).*
Krueger, KR 20130129908 A (Year: 2013).*

* cited by examiner

*Primary Examiner* — Vy T Nguyen
(74) *Attorney, Agent, or Firm* — Cheng-Ju Chiang

(57) ABSTRACT

A capsule coffee machine includes a base, a capsule channel formed at a top surface of the base, a gate, an optics lens, a guiding unit, a drip container, a collecting groove, a water injection unit connected with the guiding unit, a driving unit connected with the guiding unit, and an actuator. A bottom of the capsule channel is equipped with the gate. An inside of the capsule channel is equipped with the optics lens. The guiding unit is disposed under the gate and accommodated in the base. The drip container is connected with the guiding unit. The drip container has a mouth, a stopping wall opposite to the mouth, and a peripheral wall extended between the mouth and the stopping wall. The collecting groove is recessed towards a downward direction and in the peripheral wall of the drip container. The actuator is connected with the gate.

19 Claims, 12 Drawing Sheets

CAPSULE COFFEE MACHINE

CROSS-REFERENCE TO RELATED APPLICATION

The present application is based on, and claims priority from, China Patent Application No. 202021961523.X, filed Sep. 9, 2020, the disclosure of which is hereby incorporated by reference herein in its entirety.

BACKGROUND OF THE INVENTION

1. Field of the Invention

The present invention generally relates to a coffee machine field, and more particularly to a drop-in capsule coffee machine which extracts coffee automatically and prevents a coffee waste.

2. The Related Art

Currently, a drop-in capsule coffee machine is widely used. When coffee is brewed with a conventional capsule coffee machine which is the drop-in capsule coffee machine, a user who brews the coffee needs to open an upper cover manually and position a coffee capsule into the conventional capsule coffee machine, and then start a gate of the conventional capsule coffee machine manually for pushing the coffee capsule into an extracting device of the conventional capsule coffee machine, and select a coffee brewing mode by pressing a button manually to proceed with a coffee extraction. However, the conventional capsule coffee machine is used inconveniently and slowly, and moreover when the gate is started manually, usage forces of the users are different, relevant parts of the gate are easily damaged.

Meanwhile, in a process of extracting the coffee and bringing a coffee cup, the coffee may be partially overflowed into a drip container and has no way of flowing into the coffee cup, in consequence, the coffee is wasted.

Therefore, it is especially important to provide a drop-in capsule coffee machine, the drop-in capsule coffee machine extracts the coffee automatically, and the drop-in capsule coffee machine is operated conveniently and fast, and prevents a coffee waste.

SUMMARY OF THE INVENTION

An object of the present invention is to provide a capsule coffee machine used for brewing coffee from a coffee capsule. The capsule coffee machine includes a base, a capsule channel, a gate, an optics lens, a guiding unit, a drip container, a collecting groove, a water injection unit, a driving unit and an actuator. An inside of the base has an accommodating space. The capsule channel is formed at a top surface of the base. The capsule channel is used for connecting an external space and the accommodating space. The capsule channel has an opening end connected with the external space. A bottom of the capsule channel is equipped with the gate. An inside of the capsule channel is equipped with the optics lens. The guiding unit is disposed under the gate and accommodated in the accommodating space of the base. The drip container is connected with a lower portion of the guiding unit. The drip container is used for accommodating the coffee capsule. The drip container has a mouth penetrating through a rear surface of the drip container, a stopping wall opposite to the mouth, and a peripheral wall extended between and mounted around the mouth and the stopping wall for holding the coffee capsule. The drip container is obliquely arranged to make one side of the peripheral wall lower than the rest of the peripheral wall of the drip container. The collecting groove is recessed towards a downward direction and in a lower portion of an inside of the peripheral wall of the drip container. The water injection unit is connected with the guiding unit. The driving unit is connected with the guiding unit for driving the water injection unit to move along a predefined path which leads to the mouth of the drip container. The actuator is connected with the gate to drive the gate to be opened or closed.

Another object of the present invention is to provide a capsule coffee machine used for brewing coffee from a coffee capsule. The coffee capsule includes a capsule shell, and a capsule membrane covered on a top surface of the capsule shell. An outer surface of the capsule membrane has a two-dimensional code. The capsule coffee machine includes a base, a capsule channel, a gate, an optics lens, a guiding unit, a drip container, a collecting groove, a water injection unit, a driving unit and an actuator. An inside of the base has an accommodating space. The capsule channel is formed at a top surface of the base. The capsule channel is used for connecting an external space and the accommodating space. The capsule channel has an opening end connected with the external space. A bottom of the capsule channel is equipped with the gate. An inside of the capsule channel is equipped with the optics lens. The optics lens is aligned with the capsule membrane in the capsule channel for capturing the two-dimensional code on the capsule membrane. The guiding unit is disposed under the gate and accommodated in the accommodating space of the base. The drip container is connected with a lower portion of the guiding unit. The drip container is used for accommodating the coffee capsule. The drip container has a mouth penetrating through a rear surface of the drip container, a stopping wall opposite to the mouth, and a peripheral wall extended between and mounted around the mouth and the stopping wall for holding the coffee capsule. The drip container is obliquely arranged to make one side of the peripheral wall lower than the rest of the peripheral wall of the drip container. The collecting groove is recessed towards a downward direction and in a lower portion of an inside of the peripheral wall of the drip container. The water injection unit is connected with the guiding unit. The driving unit is connected with the guiding unit for driving the water injection unit to move along a predefined path which leads to the mouth of the drip container. The actuator is connected with the gate to drive the gate to be opened or closed.

Another object of the present invention is to provide a capsule coffee machine used for brewing coffee from a coffee capsule. The capsule coffee machine includes a base, a capsule channel, a gate, an optics lens, a guiding unit, a drip container, a collecting groove, a water injection unit, a driving unit and an actuator. An inside of the base has an accommodating space. The capsule channel is formed at a top surface of the base. The capsule channel is used for connecting an external space and the accommodating space. The capsule channel has an opening end connected with the external space. A bottom of the capsule channel is equipped with the gate. An inside of the capsule channel is equipped with the optics lens. The guiding unit is disposed under the gate and accommodated in the accommodating space of the base. The drip container is connected with a lower portion of the guiding unit. The drip container is used for accommodating the coffee capsule. The drip container has a mouth penetrating through a rear surface of the drip container, a stopping wall opposite to the mouth, and a peripheral wall extended between and mounted around the mouth and the stopping wall for holding the coffee capsule. The drip container is obliquely arranged to make one side of the peripheral wall lower than the rest of the peripheral wall of the drip container. The collecting groove is recessed towards a downward direction and in a lower portion of an inside of the peripheral wall of the drip container. The water injection unit is connected with the guiding unit. The driving unit is connected with the guiding unit for driving the water injection unit to move along a predefined path which leads to the mouth of the drip container. The actuator is connected with the gate to drive the gate to be opened or closed. The driving unit drives the water injection unit and the guiding unit to move towards the coffee capsule and the drip container to fasten the coffee capsule in the drip container to extract the coffee, or the driving unit drives the water injection unit and the guiding unit to slide away from the coffee capsule and the drip container for ejecting a capsule shell of the coffee capsule from the drip container.

As described above, in order to fasten the coffee capsule in the drip container, a pressing cap slides forward to push the coffee capsule into the drip container, and a supporting element is pressed forward by the coffee capsule, when the coffee is finished being brewed, a microprocessor controls the driving unit to pull the pressing cap away from the coffee capsule, and simultaneously, the supporting plate is pushed rearward under a counter force action of an elastic component to make the capsule shell of the coffee capsule fall towards the downward direction into a recycling box through a gap between the guiding unit and the drip container. As a result, the drop-in capsule coffee machine extracts the coffee automatically, and the drop-in capsule coffee machine is operated conveniently and fast, and prevents a coffee waste.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
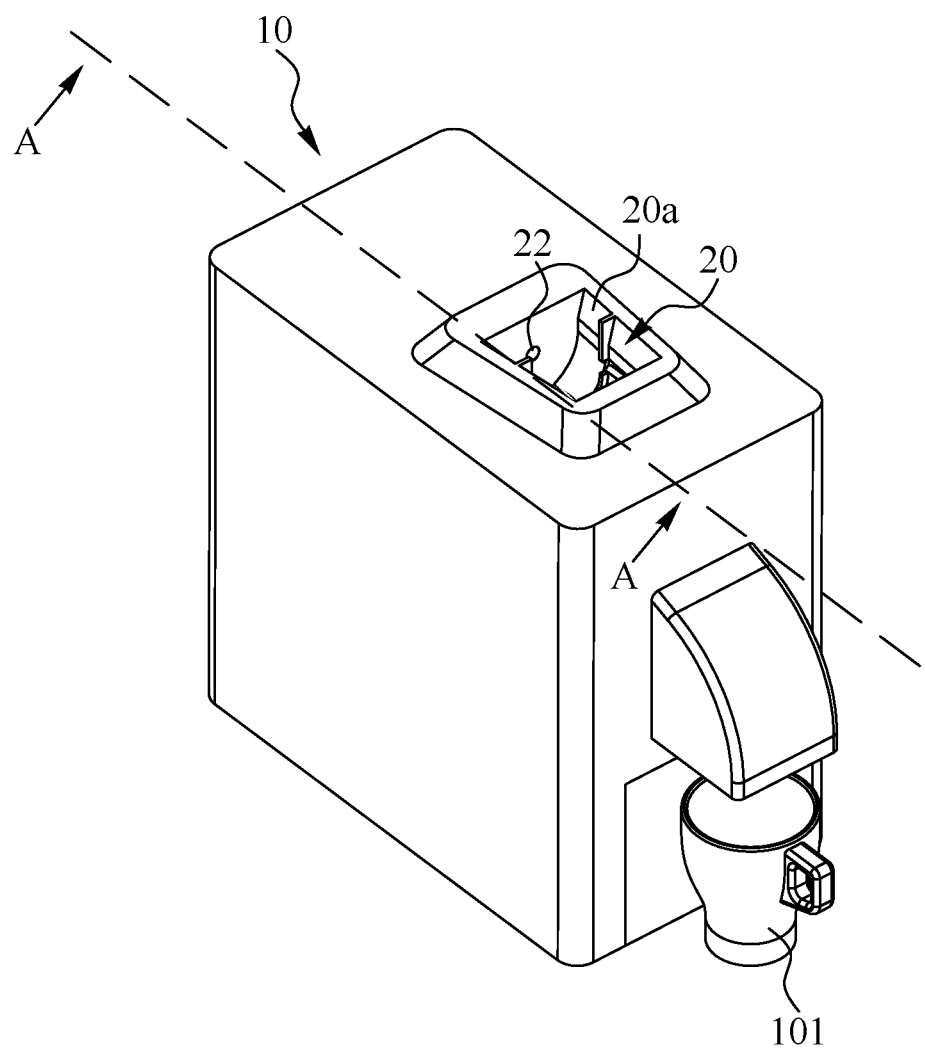
FIG. 1 is a perspective view of a capsule coffee machine in accordance with a preferred embodiment of the present invention.

Referring to FIG. 1, FIG. 2, FIG. 5 and FIG. 7, a capsule coffee machine 100 in accordance with a preferred embodiment of the present invention is shown. The capsule coffee machine 100 is a drop-in capsule coffee machine. The capsule coffee machine 100 is adapted for extracting a coffee capsule 80. The capsule coffee machine 100 is used for brewing coffee from the coffee capsule 80. The capsule coffee machine 100 includes a base 10, a capsule channel 20 formed at a top surface of the base 10, a guiding unit 30, a drip container 40 connected with a lower portion of the guiding unit 30, a water injection unit 45 connected with the guiding unit 30, and a driving unit 50 connected with the guiding unit 30. The drip container 40 is used for accommodating the coffee capsule 80.

An inside of the base 10 has an accommodating space 11. The capsule channel 20 is used for connecting an external space and the accommodating space 11. The capsule channel 20 has an opening end 20a connected with the external space, and a bottom of the capsule channel 20 is equipped with a gate 21. The guiding unit 30 is disposed under the gate 21 and is accommodated in the accommodating space 11 of the base 10.

Figure 2:
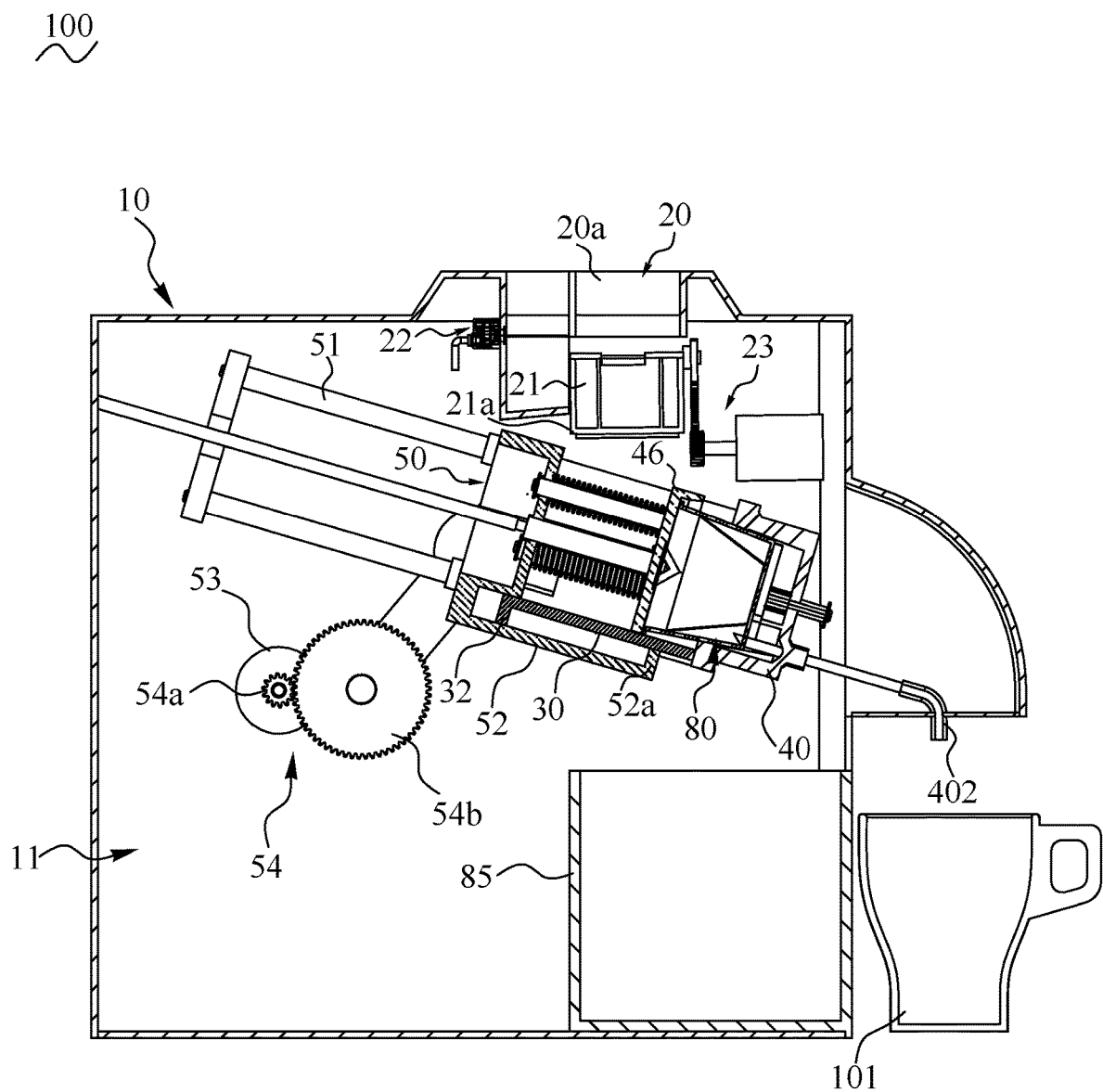
FIG. 2 is a sectional view of the capsule coffee machine along a line A-A of FIG. 1.
Figure 7:
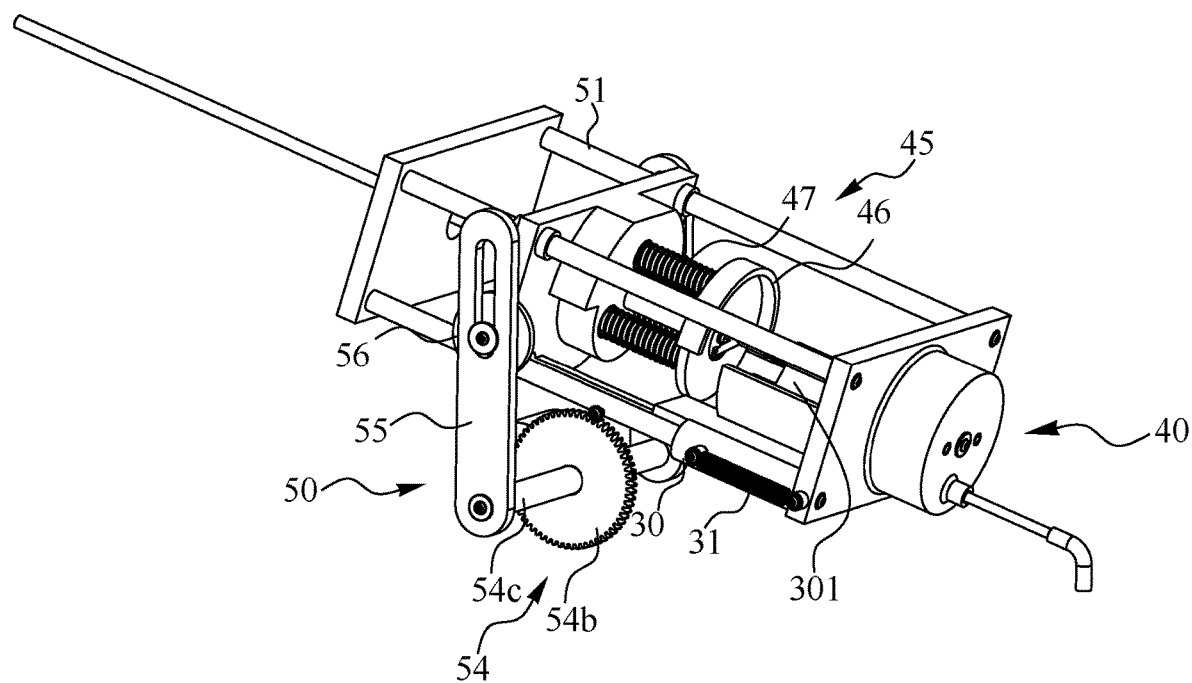
FIG. 7 is an assembling view showing that a water injection unit, a driving unit, a guiding unit and a drip container of the capsule coffee machine in accordance with the present invention.
Figure 8:
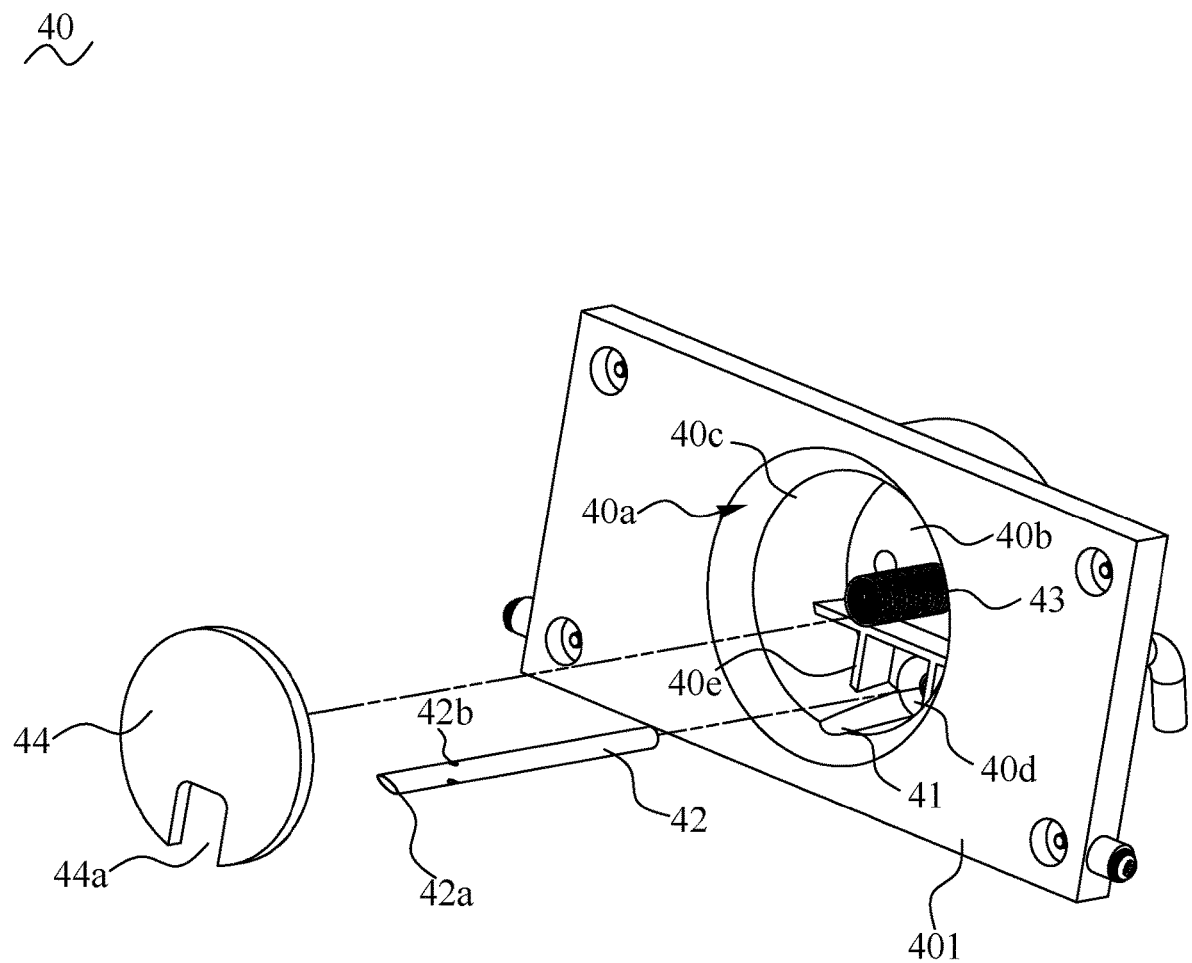
FIG. 8 is an exploded view of the drip container of the capsule coffee machine in accordance with the present invention.

Referring to FIG. 2, FIG. 7 and FIG. 8, the drip container 40 has a circular mouth 40a penetrating through a rear surface of the drip container 40, a stopping wall 40b opposite to the mouth 40a, a peripheral wall 40c extended between and mounted around the mouth 40a and the stopping wall 40b for holding the coffee capsule 80, and an extending wall 401 extended outward and opposite to the stopping wall 40b of the drip container 40 from a front of the peripheral wall 40c. The extending wall 401 surrounds the mouth 40a. The drip container 40 is obliquely arranged to make one side of the peripheral wall 40c lower than the rest of the peripheral wall 40c of the drip container 40. The driving unit 50 is connected with the guiding unit 30 for driving the water injection unit 45 to move along a predefined path which leads to the mouth 40a of the drip container 40. For describing the capsule coffee machine 100 more conveniently, the predefined path in this detailed description is a movable path along a direction (B).

Figure 5:
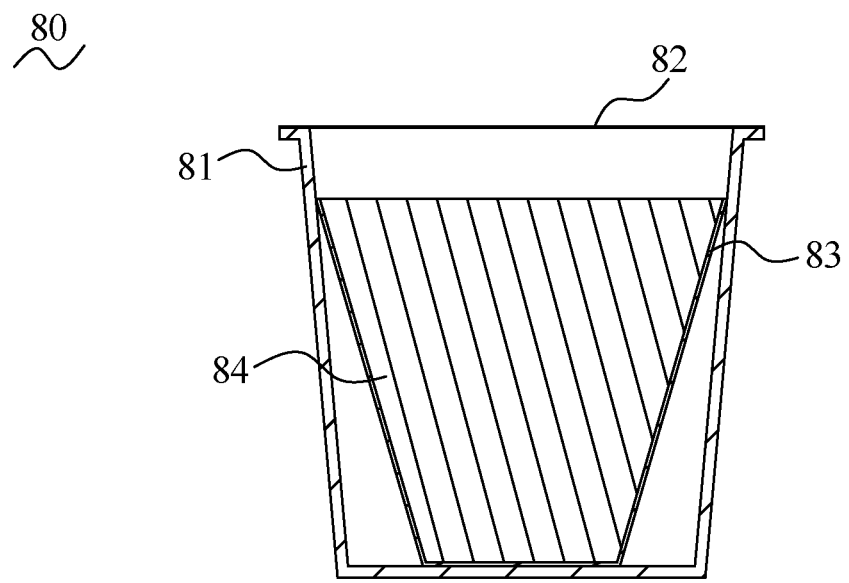
FIG. 5 is a sectional view of a coffee capsule which is adapted for being positioned in the capsule coffee machine in accordance with the present invention.
Figure 6:
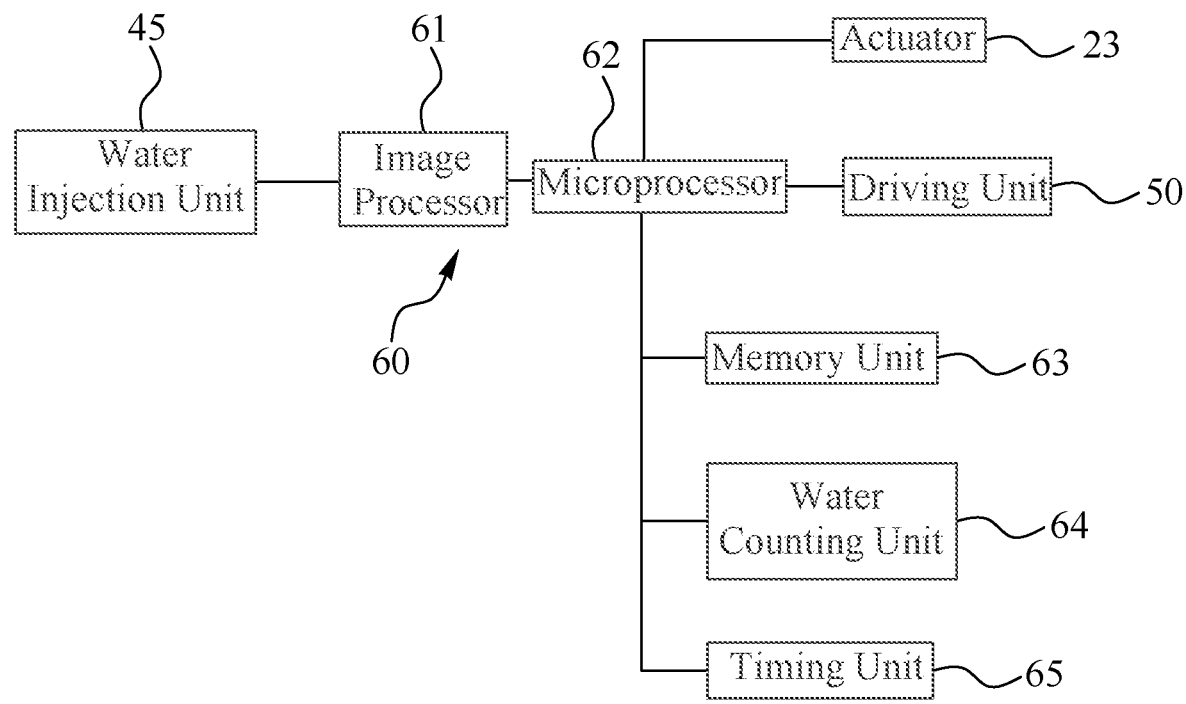
FIG. 6 is a block diagram of a control unit of the capsule coffee machine in accordance with the present invention.

Referring to FIG. 2 and FIG. 5, in this preferred embodiment, the opening end 20a is disposed to the top surface of the base 10, and the coffee capsule 80 is inserted into the capsule channel 20 through the opening end 20a to ensure that one side surface of the coffee capsule 80 contacts with the gate 21. The coffee capsule 80 includes a capsule shell 81, a capsule membrane 82 covered on a top surface of the capsule shell 81, a filter mesh 83 arranged in an inside space of the capsule shell 81, and a plurality of coffee particles 84 filled inside the filter mesh 83.

Referring to FIG. 2 to FIG. 6, in the preferred embodiment, in order to make the capsule coffee machine 100 adjust parameters of extracting the coffee automatically according to a type of coffee capsule 80. An outer surface of the capsule membrane 82 has a two-dimensional code which stores data of brewing the coffee and other data. The two-dimensional code is a QR (Quick Response) code. One side of an inside of the capsule channel 20 is equipped with an optics lens 22. The optics lens 22 is aligned with the capsule membrane 82 in the capsule channel 20 for capturing the two-dimensional code which is the QR code printed on the capsule membrane 82. The capsule coffee machine 100 further includes a control unit 60 and an actuator 23. The optics lens 22 is electrically connected with the control unit 60 and the actuator 23 in telecommunication. The actuator 23 is connected with the gate 21 to drive the gate 21 to be opened or closed.

The control unit 60 includes an image processor 61 for receiving and identifying image data, a microprocessor 62 for confirming and controlling the actuator 23, a memory unit 63 for storing identified image data, a water counting unit 64 for calculating an amount of water, and a timing unit 65 for calculating waiting time.

Referring to FIG. 2 to FIG. 12, a plurality of programs to be executed by the microprocessor 62 are stored in the memory unit 63. When the programs are executed, the capsule coffee machine 100 performs steps as follows.

Capture image data of the two-dimensional code which is the QR code printed on the capsule membrane 82 via the optics lens 22.

Identify the image data of the two-dimensional code via the image processor 61.

Compare the identified image data of the two-dimensional code with data which includes brewing parameters beforehand stored in the memory unit 63 by the microprocessor 62.

Open the gate 21 by driving the actuator 23 to let the coffee capsule 80 fall into the drip container 40.

Slide the water injection unit 45 by the driving unit 50 to fasten the coffee capsule 80 in the drip container 40 to extract the coffee.

Inject hot water into the coffee capsule 80 via the water injection unit 45 and calculate the amount of the injected water of the water injection unit 45 by the water counting unit 64.

Calculate extracting time of the coffee via the timing unit 65.

Furthermore, when the coffee is finished being brewed, the driving unit 50 drives the water injection unit 45 to slide away from the coffee capsule 80, and simultaneously, pull the guiding unit 30 to be separated from the drip container 40 for ejecting the coffee capsule 80 from the drip container 40 to make the coffee capsule 80 fall into a recycling box 85.

Figure 3:
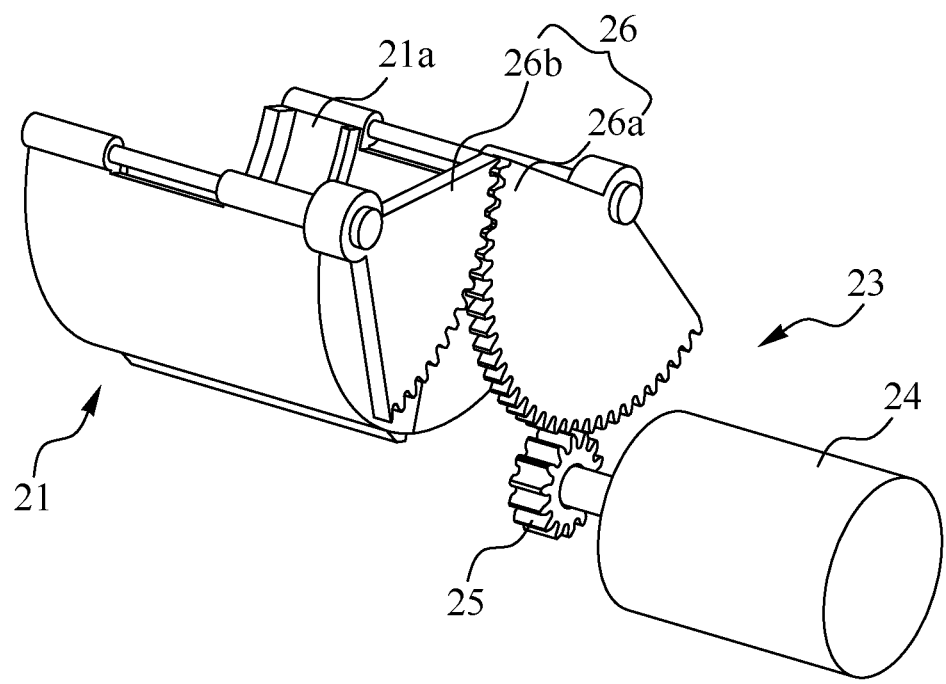
FIG. 3 is a perspective view of a gate of the capsule coffee machine, wherein the gate is closed.
Figure 4:
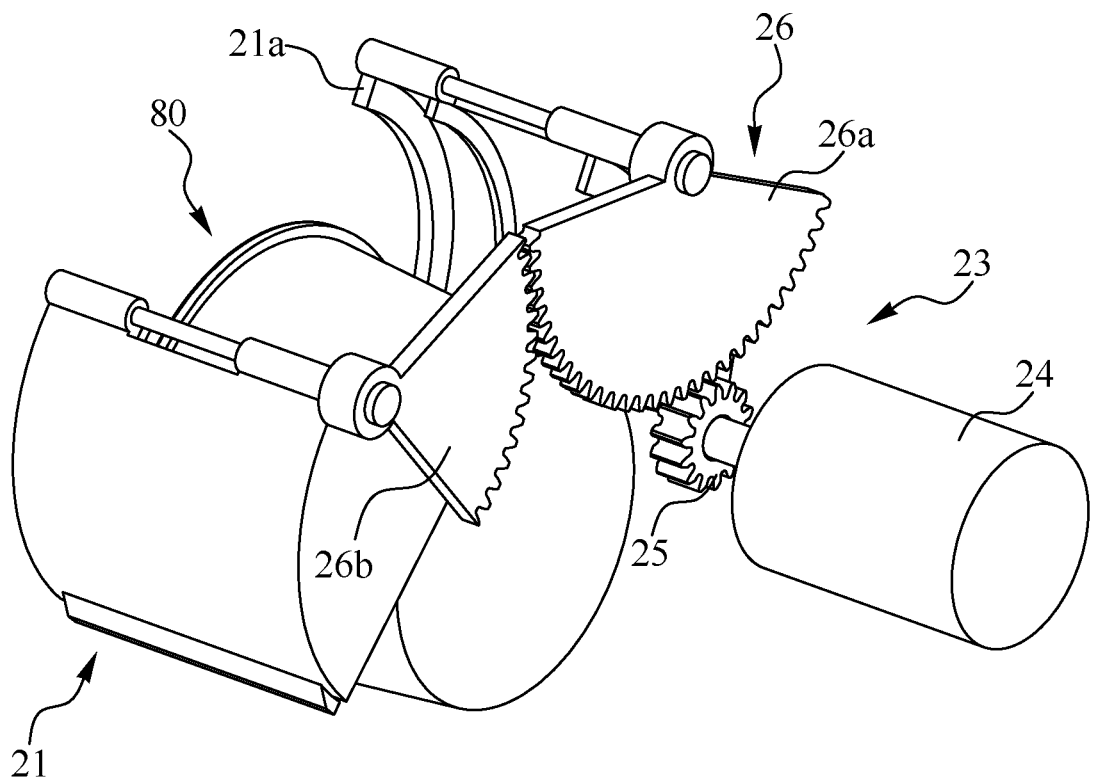
FIG. 4 is a perspective view of the gate of the capsule coffee machine, wherein the gate is opened.

Referring to FIG. 2 to FIG. 4, in the preferred embodiment, in order to describe structures of the gate 21 and the actuator 23 and steps of operating the gate 21 and the actuator 23 in detail, the gate 21 includes a pair of blocking walls 21a. The gate 21 includes two blocking walls 21a pivotally connected to the bottom of the capsule channel 20. The two blocking walls 21a are curved towards a downward direction and are shown as arc shapes. Concave surfaces of the two blocking walls 21a are disposed towards an upward direction. The upward direction is opposite to the downward direction. The guiding unit 30 is an indentation. A concave surface of the guiding unit 30 is disposed towards the upward direction. The guiding unit 30 is located below the gate 21 for guiding the coffee capsule 80.

Figure 9:
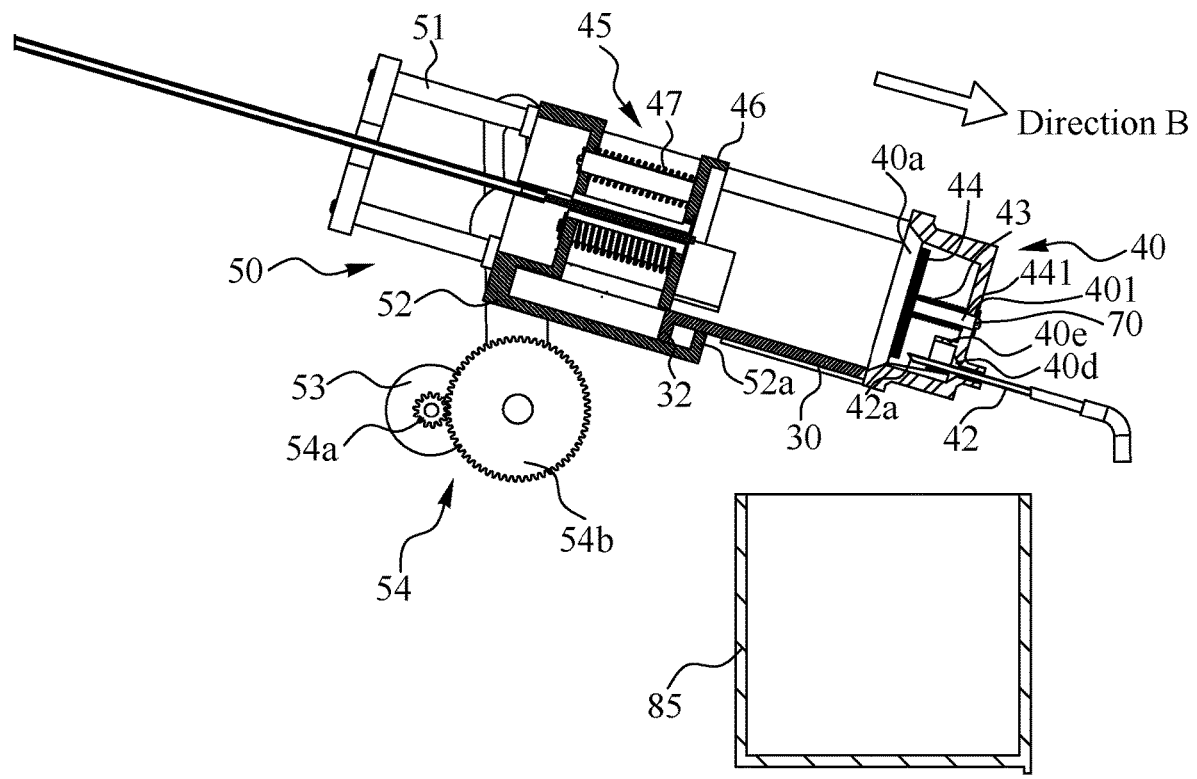
FIG. 9 is a schematic diagram that shows an original state of the capsule coffee machine.
Figure 10:
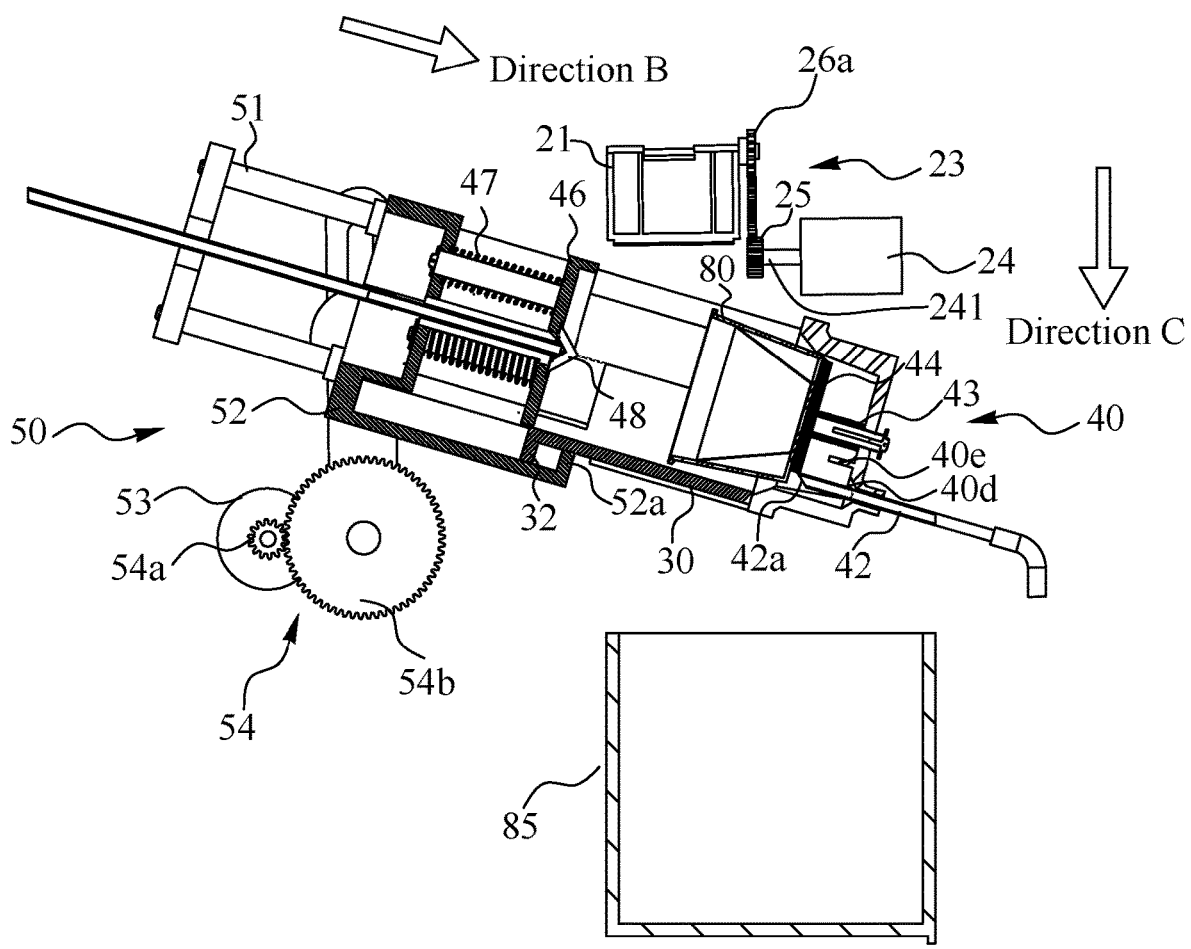
FIG. 10 is a schematic diagram of the capsule coffee machine showing that the coffee capsule is positioned in the guiding unit of the capsule coffee machine in accordance with the present invention.
Figure 11:
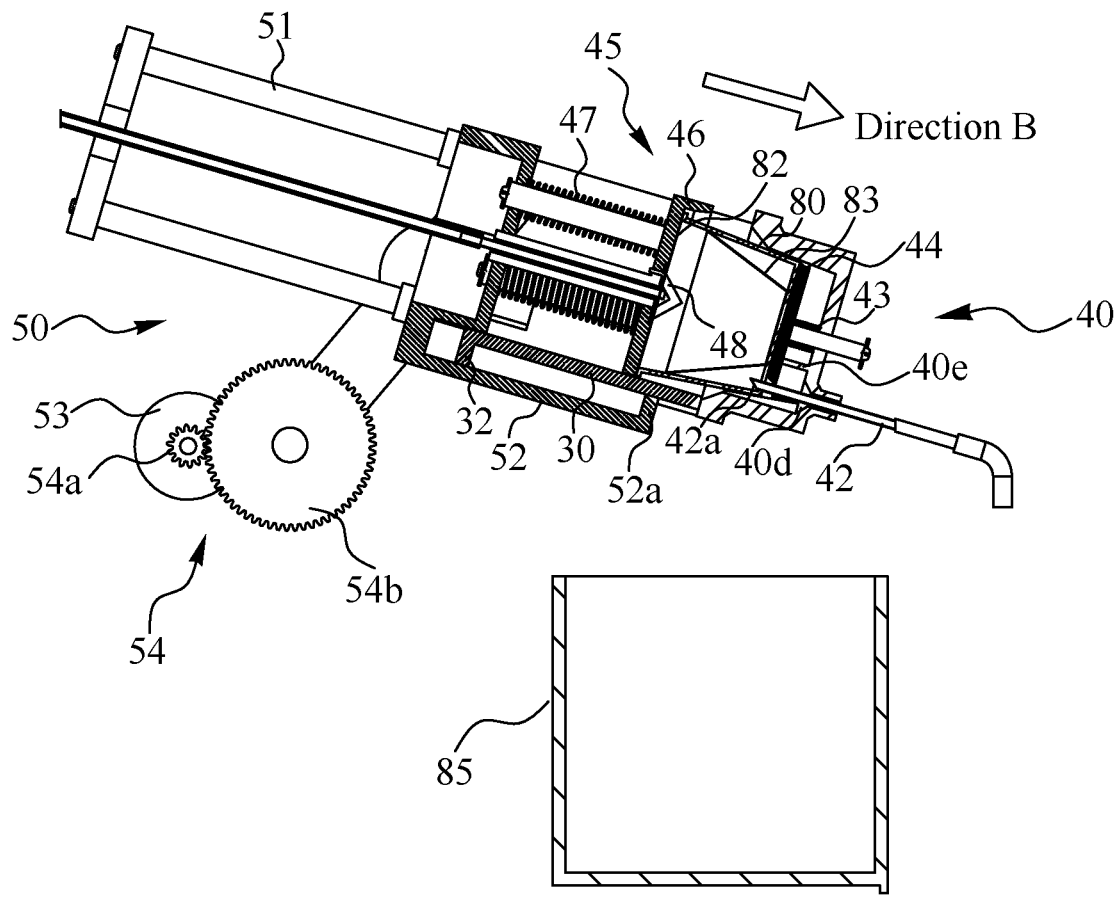
FIG. 11 is a schematic diagram showing an extracting state of the capsule coffee machine.
Figure 12:
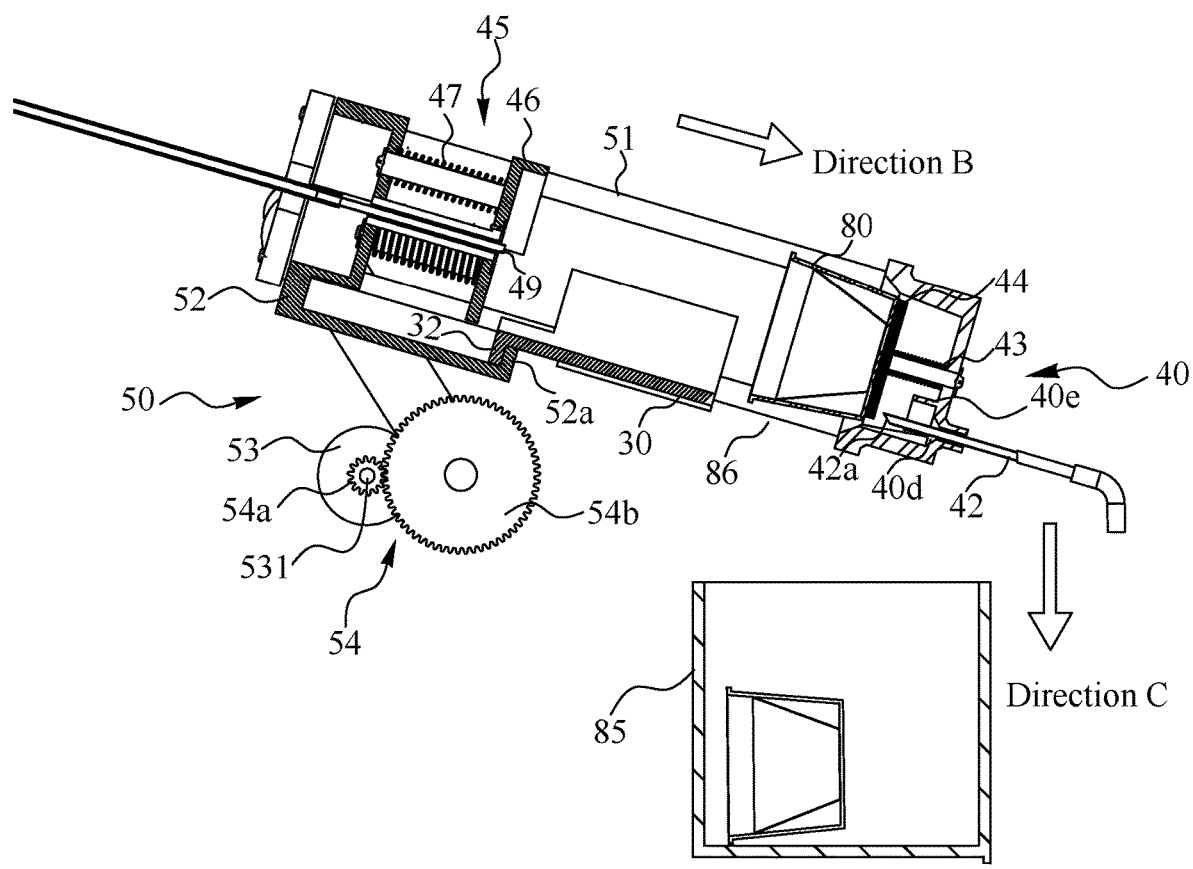
FIG. 12 is a schematic diagram showing that the guiding unit is apart away from the drip container of the capsule coffee machine in accordance with the present invention.

Referring to FIG. 3, FIG. 4 and FIG. 9, the actuator 23 includes a first server motor 24 fastened in the accommodating space 11, a first driving gear 25 connected to a first rotation shaft 241 of the first server motor 24, and a pair of engaged first follower gears 26. The pair of the first follower gears 26 include two first follower gears 26. Each first follower gear 26 is connected with one blocking wall 21a, and one first follower gear 26 is engaged with the first driving gear 25.

In the preferred embodiment, the pair of the follower gears 26 include a first fan-shape gear 26a and a second fan-shape gear 26b. The first fan-shape gear 26a is engaged with the first driving gear 25 and is fastened with one blocking wall 21a. The second fan-shape gear 26b is engaged with the first fan-shape gear 26a and is fastened with the other blocking wall 21a. Therefore, when the microprocessor 62 controls the first server motor 24 to rotate clockwise or anticlockwise, the first driving gear 25 drives the pair of the first follower gears 26 to rotate, and then the two blocking walls 21a are separated from each other to open the gate 21, or the two blocking walls 21a are connected with each other to close the gate 21.

Referring to FIG. 2 to FIG. 12, in order to describe structures of the driving unit 50 and the guiding unit 30 and steps of operating the driving unit 50 and the guiding unit 30 in detail, in this preferred embodiment, the driving unit 50 includes at least two sliding rails 51 which are arranged perpendicular to the extending wall 401 of the mouth 40a, a sliding pedestal 52 slidably arranged on the at least two sliding rails 51 and connected with the water injection unit 45, a second server motor 53, two swinging arms 55 driven by the second server motor 53, a transmission structure 54 connected between the second server motor 53 and the two swinging arms 55, and two sliding blocks 56 slidably mounted to the two swinging arms 55. Each sliding block 56 is pivotally connected with one swinging arm 55. The driving unit 50 includes two upper sliding rails 51, and two lower sliding rails 51 located under the two upper sliding rails 51.

The transmission structure 54 includes a second driving gear 54a connected with a second rotation shaft 531 of the second server motor 53, a second follower gear 54b engaged with the second driving gear 54a, and a fastening shaft 54c penetrating through an axis center of the second follower gear 54b. Two opposite ends of the fastening shaft 54c are connected with the two swinging arms 55. The guiding unit 30 is slidably fastened to the at least two sliding rails 51. A middle of a top of the guiding unit 30 is recessed towards the downward direction to form a guiding groove 301. Two opposite sides of the guiding unit 30 are hollow. The two opposite sides of the guiding unit 30 are slidably mounted around the two lower sliding rails 51. The two opposite sides of the guiding unit 30 are equipped with two tension springs 31, and the guiding unit 30 and the drip container 40 are connected between the two tension springs 31. One ends of the two tension springs 31 are connected to two opposite side surfaces of the drip container 40, and the other ends of the two tension springs 31 are connected to the two opposite sides of the guiding unit 30 for pulling the guiding unit 30 toward the drip container 40. A bottom of a rear end of the guiding unit 30 further protrudes towards the downward direction to form a first traction block 32. A top of a front end of the sliding pedestal 52 protrudes towards the upward direction to form a second traction block 52a. The first traction block 32 and the second traction block 52a are arched towards the downward direction and are shown as bow shapes. The first traction block 32 is matched with and is blocked by the second traction block 52a. The first traction block 32 is buckled with the second traction block 52a. The second traction block 52a of the sliding pedestal 52 drags the first traction block 32 of the guiding unit 30 for dragging the guiding unit 30 to move away from the drip container 40.

Referring to FIG. 9 to FIG. 12, in order to describe structures of the water injection unit 45 and the drip container 40 and steps of operating the water injection unit 45 and the drip container 40 in detail, the water injection unit 45 includes a pressing cap 46 for fastening the coffee capsule 80 in the drip container 40, at least one elastic element 47 contacting with the sliding pedestal 52 for pushing the pressing cap 46, at least one blade 48 arranged on a surface of the pressing cap 46 towards the drip container 40 for contacting with the capsule membrane 82, and at least one water outlet 49 longitudinally penetrating through the surface of the pressing cap 46 towards the drip container 40. The pressing cap 46 is fastened to the sliding pedestal 52. In order to describe conveniently, the surface of the pressing cap 46 in the detailed description contacts with the capsule membrane 82.

Referring to FIG. 8 and FIG. 9, the drip container 40 has a collecting groove 41 recessed towards the downward direction and in a lower portion of an inside of the peripheral wall 40c of the drip container 40 for gathering leaked coffee. The collecting groove 41 is shown as an arched shape. A concave surface of the collecting groove 41 is towards the upward direction, and a width of the collecting groove 41 gradually becomes wider from the stopping wall 40b of the drip container 40 to the mouth 40a of the drip container 40. The stopping wall 40b of the drip container 40 has a funnel-shape gathering channel 40d longitudinally penetrating through the stopping wall 40b of the drip container 40 and connecting with a bottom of the collecting groove 41. The drip container 40 is equipped with a guiding tube 42 passing through the gathering channel 40d. A free end of the guiding tube 42 is connected with a bent outlet tube 402. The outlet tube 402 is exposed out of the base 10.

The drip container 40 is further equipped with an elastic component 43 fastened to an inner surface of the stopping wall 40b of the drip container 40, a supporting element 44 mounted to and connected to a rear of the elastic component 43, a limiting rib 40e perpendicularly arranged to the inner surface of the stopping wall 40b of the drip container 40 for avoiding the supporting element 44 being overly pressed towards the inner surface of the stopping wall 40b of the drip container 40. A middle of the stopping wall 40b of the drip container 40 defines a fastening hole 401. The elastic component 43 is corresponding to the fastening hole 401. Several portions of a front surface of the supporting element 44 protrude perpendicular to the front surface of the supporting element 44 to form a plurality of fastening pillars 441.

One fastening pillar 441 is hollow. The one fastening pillar 441 passes the elastic component 43 and the fastening hole 401. The drip container 40 is equipped with a screw 70. A rear end of the screw 70 is inserted into the fastening hole 401 and a middle of the one fastening pillar 441. A periphery of a front end of the screw 70 is blocked by the stopping wall 40b of the drip container 40. An outer portion of a lower side of the supporting element 44 is recessed inward to form a notch 44a. The guiding tube 42 is fastened in the gathering channel 40d and passes through the notch 44a. The supporting element 44 is parallel to the stopping wall 40b of the drip container 40. A rear end of the guiding tube 42 has a piercing tip 42a, and at least one collecting hole 42b formed at a side surface of the guiding tube 42 and located in front of the piercing tip 42a. The at least one collecting hole 42b is located to and connected to the gathering channel 40d.

Referring to FIG. 1 to FIG. 12, a process of fastening the coffee capsule 80 to the drip container 40 and a process of ejecting the coffee capsule 80 out of the drip container 40 are shown as below. The driving unit 50 drives the water injection unit 45 and the guiding unit 30 to move towards the coffee capsule 80 and the drip container 40 to fasten the coffee capsule 80 in the drip container 40 to extract the coffee, or the driving unit 50 drives the water injection unit 45 and the guiding unit 30 to slide away from the coffee capsule 80 and the drip container 40 for ejecting the capsule shell 81 of the coffee capsule 80 from the drip container 40 to make the coffee capsule 80 fall into the recycling box 85.

In order to fasten the coffee capsule 80 in the drip container 40, the pressing cap 46 slides forward and towards the direction (B) to push the coffee capsule 80 into the drip container 40, and the supporting element 44 is pressed forward by the coffee capsule 80. When the supporting element 44 is pressed forward by the coffee capsule 80, and the capsule membrane 82 is cut by the at least one blade 48, the hot water is injected into the coffee capsule 80 through the at least one water outlet 49. The piercing tip 42a of the guiding tube 42 passes through the notch 44a to pierce through the capsule shell 81 to enter an inside of the coffee capsule 80. The limiting rib 40e arranged on the stopping wall 40b limits the supporting element 44 being overly pressed towards the stopping wall 40b of the drip container 40, so that the piercing tip 42a is prevented from piercing through and breaking the filter mesh 83. Meanwhile, the collecting groove 41 is designed as the arched shape, so partial coffee is leaked from the guiding tube 42 is guided to the collecting hole 42b linking with the side surface of the guiding tube 42 by the collecting groove 41 and the gathering channel 40d to flow back into the guiding tube 42. And when the coffee is finished being brewed, the microprocessor 62 controls the driving unit 50 to pull the pressing cap 46 away from the coffee capsule 80, and simultaneously, the supporting element 44 is pushed rearward under a counter force action of the elastic component 43 to make the capsule shell 81 of the coffee capsule 80 fall towards the downward direction into the recycling box 85 through a gap 86 between the guiding unit 30 and the drip container 40.

Specifically, when the microprocessor 62 controls the second server motor 53 to rotate clockwise, the second driving gear 54a drives the second follower gear 54b to rotate, the second follower gear 54b drives the fastening shaft 54c to rotate, and the fastening shaft 54c drives the two swinging arms 55 along the two sliding blocks 56 to rotate clockwise to an angle, simultaneously, the two swinging arms 55 push the sliding pedestal 52 forward and towards the direction (B) to slide along the at least two lower sliding rails 51 linearly, so that the guiding unit 30 is overlapped with the sliding pedestal 52, the tension spring 31 is compressed, and the guiding unit 30 abuts against the drip container 40. The at least one elastic element 47 is compressed, the pressing cap 46 is pushed towards the drip container 40 by a compression action of the at least one elastic element 47. The pressing cap 46 pushes the coffee capsule 80 into the drip container 40 through the guiding groove 301. The supporting element 44 moves forward until the supporting element 44 is blocked by the limiting rib 40e. The piercing tip 42a of the guiding tube 42 pierces a front of the capsule shell 81 of the coffee capsule 80 to enter the inside of the coffee capsule 80. The at least one blade 48 cuts the capsule membrane 82 of the coffee capsule 80. The at least one water outlet 49 enters a rear end of the coffee capsule 80. The pressing cap 46 is pressed on and is tightly attached to the capsule membrane 82 of the coffee capsule 80. The hot water flows into the inside of the coffee capsule 80 through the at least one water outlet 49. Coffee is formed by virtue of the plurality of the coffee particles 84 being brewed in the hot water. After the coffee is filtered by the filter mesh 83, the coffee flows to a front end of the coffee capsule 80. The filtered coffee flows to the outlet tube 402 through the guiding tube 42, and finally the coffee flows into a coffee cup 101. The water injection unit 45 pushes the coffee capsule 80, and the coffee capsule 80 is fastened in the drip container 40. When the coffee is extracted to a set water quantity, the hot water is stopped providing for the coffee capsule 80, at the moment, the microprocessor 62 stops controlling the driving unit 50 to rotate clockwise.

With reference to FIG. 8 to FIG. 12, when the microprocessor 62 controls the second server motor 53 to rotate anticlockwise, the second server motor 53 rotates anticlockwise, the second driving gear 54a drives the second follower gear 54b to rotate, the second follower gear 54b drives the fastening shaft 54c to rotate, and the fastening shaft 54c drives the two swinging arms 55 along the two sliding blocks 56 to rotate anticlockwise to an angle, simultaneously, the two swinging arms 55 pull the sliding pedestal 52 rearward and towards a direction opposite to the direction (B) to slide along the at least two lower sliding rails 51 linearly, so that the guiding unit 30 is separated from the drip container 40 and towards the direction opposite to the direction (B) under a drive of the first traction block 32 buckled with the second traction block 52a, and the tension spring 31 is released and then is stretched towards the direction opposite to the direction (B) under a traction of the second traction block 52a of the sliding pedestal 52, synchronously. The guiding unit 30 is spaced from the drip container 40 to form the gap 86 between the guiding unit 30 and the drip container 40. The at least one elastic element 47 is released, the pressing cap 46 is apart away from the drip container 40 by a resilience action of the at least one elastic element 47. The pressing cap 46 moves away from the coffee capsule 80. The water injection unit 45 is dragged rearward by the sliding pedestal 52 and moves away from the coffee capsule 80 for releasing the capsule shell 81 of the coffee capsule 80. The supporting element 44 is pushed rearward by the elastic component 43, so that the capsule shell 81 of the coffee capsule 80 is pushed by the supporting element 44 to move rearward and opposite to the direction (B), and the capsule shell 81 is further pushed out of the drip container 40 and is released to fall towards the downward direction into the recycling box 85 through the gap 86.

Then the timing unit 65 counts down for predetermined waiting time for ejecting the capsule shell 81 of the coffee capsule 80. When the capsule shell 81 falls into the recycling box 85 through the timing unit 65 calculating that the predetermined time is up, the microprocessor 62 controls the second server motor 53 to rotate clockwise again, the second driving gear 54a drives the second follower gear 54b to rotate, the second follower gear 54b drives the fastening shaft 54c to rotate, and the fastening shaft 54c drives the two swinging arms 55 along the two sliding blocks 56 to rotate clockwise to an angle, simultaneously, the two swinging arms 55 push the sliding pedestal 52 forward and towards the direction (B) to slide along the at least two lower sliding rails 51 to return to an original position of the sliding pedestal 52, so that the guiding unit 30 abuts against the drip container 40. The at least one elastic element 47 is compressed, the pressing cap 46 is pushed towards the drip container 40 by the compression action of the at least one elastic element 47 to return to an original position of the pressing cap 46. The guiding unit 30 is pulled to a connection state of the guiding unit 30 and the drip container 40 under a counter force action of the tension spring 31. The guiding unit 30 is pulled rearward to an original position of the guiding unit 30 by the tension spring 31.

As described above, in order to fasten the coffee capsule 80 in the drip container 40, the pressing cap 46 slides towards the direction (B) to push the coffee capsule 80 into the drip container 40, and the supporting element 44 is pressed forward by the coffee capsule 80, when the coffee is finished being brewed, the microprocessor 62 controls the driving unit 50 to pull the pressing cap 46 away from the coffee capsule 80, and simultaneously, the supporting element 44 is pushed rearward under the counter force action of the elastic component 43 to make the capsule shell 81 of the coffee capsule 80 fall towards the downward direction into the recycling box 85 through the gap 86 between the guiding unit 30 and the drip container 40. As a result, the drop-in capsule coffee machine 100 extracts the coffee automatically, and the drop-in capsule coffee machine 100 is operated conveniently and fast, and prevents a coffee waste.

What is claimed is:

1. A capsule coffee machine used for brewing coffee from a coffee capsule, comprising:
    a base, an inside of the base having an accommodating space;
    a capsule channel formed at a top surface of the base, the capsule channel being used for connecting an external space and the accommodating space, the capsule channel having an opening end connected with the external space;
    a gate, a bottom of the capsule channel being equipped with the gate;
    an optics lens, an inside of the capsule channel being equipped with the optics lens;
    a guiding unit disposed under the gate and accommodated in the accommodating space of the base;
    a drip container connected with a lower portion of the guiding unit, the drip container being used for accommodating the coffee capsule, the drip container having a mouth penetrating through a rear surface of the drip container, a stopping wall opposite to the mouth, and a peripheral wall extended between and mounted around the mouth and the stopping wall for holding the coffee capsule, the drip container being obliquely arranged to make one side of the peripheral wall lower than the rest of the peripheral wall of the drip container;
    a collecting groove recessed towards a downward direction and in a lower portion of an inside of the peripheral wall of the drip container;
    a water injection unit connected with the guiding unit;
    a driving unit connected with the guiding unit for driving the water injection unit to move along a predefined path which leads to the mouth of the drip container; and
    an actuator connected with the gate to drive the gate to be opened or closed.

2. The capsule coffee machine as claimed in claim 1, wherein the gate includes two blocking walls pivotally connected to the bottom of the capsule channel, the two blocking walls are curved towards the downward direction and are shown as arc shapes, the actuator includes a first server motor fastened in the accommodating space, a first driving gear connected to a first rotation shaft of the first server motor, and a pair of engaged first follower gears which include two first follower gears, each first follower gear is connected with one blocking wall, and one first follower gear is engaged with the first driving gear.

3. The capsule coffee machine as claimed in claim 2, further comprising a control unit, the optics lens being electrically connected with the control unit and the actuator, the control unit including a microprocessor for confirming and controlling the actuator, when the microprocessor controls the first server motor to rotate clockwise or anticlockwise, the first driving gear driving the pair of the first follower gears to rotate, and then the two blocking walls being separated from each other to open the gate, or the two blocking walls being connected with each other to close the gate.

4. The capsule coffee machine as claimed in claim 2, wherein the drip container has an extending wall extended outward and opposite to the stopping wall of the drip container from a front of the peripheral wall, the extending wall surrounds the mouth, the driving unit includes at least two sliding rails which are arranged perpendicular to the extending wall of the mouth, a sliding pedestal slidably arranged on the at least two sliding rails and connected with the water injection unit, a second server motor, two swinging arms driven by the second server motor, a transmission structure connected between the second server motor and the two swinging arms, and two sliding blocks slidably mounted to the two swinging arms, each sliding block is pivotally connected with one swinging arm.

5. The capsule coffee machine as claimed in claim 4, wherein the water injection unit includes a pressing cap for fastening the coffee capsule in the drip container, at least one elastic element contacting with the sliding pedestal for pushing the pressing cap, at least one blade arranged on a surface of the pressing cap towards the drip container, and at least one water outlet longitudinally penetrating through the surface of the pressing cap towards the drip container, the pressing cap is fastened to the sliding pedestal.

6. The capsule coffee machine as claimed in claim 4, wherein the transmission structure includes a second driving gear connected with a second rotation shaft of the second server motor, a second follower gear engaged with the second driving gear, and a fastening shaft penetrating through an axis center of the second follower gear, two opposite ends of the fastening shaft are connected with the two swinging arms.

7. The capsule coffee machine as claimed in claim 1, wherein the guiding unit is an indentation, a concave surface of the guiding unit is disposed towards an upward direction, the guiding unit is located below the gate for guiding the coffee capsule.

8. The capsule coffee machine as claimed in claim 1, wherein the drip container is further equipped with an elastic component fastened to an inner surface of the stopping wall of the drip container, a supporting element mounted to and connected to a rear of the elastic component, a limiting rib perpendicularly arranged to the inner surface of the stopping wall of the drip container, an outer portion of a lower side of the supporting element is recessed inward to form a notch, the supporting element is parallel to the stopping wall of the drip container.

9. The capsule coffee machine as claimed in claim 8, wherein a middle of the stopping wall of the drip container defines a fastening hole, the elastic component is corresponding to the fastening hole, several portions of a front surface of the supporting element protrude perpendicular to the front surface of the supporting element to form a plurality of fastening pillars, one fastening pillar is hollow, the one fastening pillar passes the elastic component and the fastening hole, the drip container is equipped with a screw, a rear end of the screw is inserted into the fastening hole and a middle of the one fastening pillar, a periphery of a front end of the screw is blocked by the stopping wall of the drip container.

10. The capsule coffee machine as claimed in claim 8, wherein the drip container has an extending wall extended outward and opposite to the stopping wall of the drip container from a front of the peripheral wall, the driving unit includes at least two sliding rails which are arranged perpendicular to the extending wall, the guiding unit is slidably fastened to the at least two sliding rails, two opposite sides of the guiding unit are equipped with two tension springs, and the guiding unit and the drip container are connected between the two tension springs, one ends of the two tension springs are connected to two opposite side surfaces of the drip container, and the other ends of the two tension springs are connected to the two opposite sides of the guiding unit.

11. The capsule coffee machine as claimed in claim 10, wherein a middle of a top of the guiding unit is recessed towards the downward direction to form a guiding groove, the two opposite sides of the guiding unit are hollow, the two opposite sides of the guiding unit are slidably mounted around two lower sliding rails.

12. The capsule coffee machine as claimed in claim 10, wherein a bottom of a rear end of the guiding unit further protrudes towards the downward direction to form a first traction block, the driving unit includes a sliding pedestal slidably arranged on the at least two sliding rails and connected with the water injection unit, a top of a front end of the sliding pedestal protrudes towards an upward direction to form a second traction block, the first traction block is buckled with the second traction block, the second traction block of the sliding pedestal drags the first traction block of the guiding unit for dragging the guiding unit to move away from the drip container.

13. The capsule coffee machine as claimed in claim 12, wherein the first traction block and the second traction block are arched towards the downward direction and are shown as bow shapes.

14. The capsule coffee machine as claimed in claim 8, wherein the stopping wall of the drip container has a funnel-shape gathering channel longitudinally penetrating through the stopping wall of the drip container and connecting with a bottom of the collecting groove, the drip container is equipped with a guiding tube, the guiding tube is fastened in the gathering channel and passes through the notch.

15. The capsule coffee machine as claimed in claim 14, wherein a rear end of the guiding tube has a piercing tip, and at least one collecting hole formed at a side surface of the guiding tube and located in front of the piercing tip, the at least one collecting hole is located to and connected to the gathering channel.

16. The capsule coffee machine as claimed in claim 1, wherein the collecting groove is shown as an arched shape, a concave surface of the collecting groove is towards an upward direction, and a width of the collecting groove gradually becomes wider from the stopping wall of the drip container to the mouth of the drip container.

17. A capsule coffee machine used for brewing coffee from a coffee capsule, the coffee capsule including a capsule shell, and a capsule membrane covered on a top surface of the capsule shell, an outer surface of the capsule membrane having a two-dimensional code, the capsule coffee machine comprising:
  a base, an inside of the base having an accommodating space;
  a capsule channel formed at a top surface of the base, the capsule channel being used for connecting an external space and the accommodating space, the capsule channel having an opening end connected with the external space;
  a gate, a bottom of the capsule channel being equipped with the gate;
  an optics lens, an inside of the capsule channel being equipped with the optics lens, the optics lens being aligned with the capsule membrane in the capsule channel for capturing the two-dimensional code on the capsule membrane;

a guiding unit disposed under the gate and accommodated in the accommodating space of the base;

a drip container connected with a lower portion of the guiding unit, the drip container being used for accommodating the coffee capsule, the drip container having a mouth penetrating through a rear surface of the drip container, a stopping wall opposite to the mouth, and a peripheral wall extended between and mounted around the mouth and the stopping wall for holding the coffee capsule, the drip container being obliquely arranged to make one side of the peripheral wall lower than the rest of the peripheral wall of the drip container;

a collecting groove recessed towards a downward direction and in a lower portion of an inside of the peripheral wall of the drip container;

a water injection unit connected with the guiding unit;

a driving unit connected with the guiding unit for driving the water injection unit to move along a predefined path which leads to the mouth of the drip container; and an actuator connected with the gate to drive the gate to be opened or closed.

18. The capsule coffee machine as claimed in claim 17, wherein the two-dimensional code is a QR (Quick Response) code.

19. A capsule coffee machine used for brewing coffee from a coffee capsule, comprising:

a base, an inside of the base having an accommodating space;

a capsule channel formed at a top surface of the base, the capsule channel being used for connecting an external space and the accommodating space, the capsule channel having an opening end connected with the external space;

a gate, a bottom of the capsule channel being equipped with the gate;

an optics lens, an inside of the capsule channel being equipped with the optics lens;

a guiding unit disposed under the gate and accommodated in the accommodating space of the base;

a drip container connected with a lower portion of the guiding unit, the drip container being used for accommodating the coffee capsule, the drip container having a mouth penetrating through a rear surface of the drip container, a stopping wall opposite to the mouth, and a peripheral wall extended between and mounted around the mouth and the stopping wall for holding the coffee capsule, the drip container being obliquely arranged to make one side of the peripheral wall lower than the rest of the peripheral wall of the drip container;

a collecting groove recessed towards a downward direction and in a lower portion of an inside of the peripheral wall of the drip container;

a water injection unit connected with the guiding unit;

a driving unit connected with the guiding unit for driving the water injection unit to move along a predefined path which leads to the mouth of the drip container; and an actuator connected with the gate to drive the gate to be opened or closed;

wherein the driving unit drives the water injection unit and the guiding unit to move towards the coffee capsule and the drip container to fasten the coffee capsule in the drip container to extract the coffee, or the driving unit drives the water injection unit and the guiding unit to slide away from the coffee capsule and the drip container for ejecting a capsule shell of the coffee capsule from the drip container.

* * * * *